(12) United States Patent
Torabi Mirzaee

(10) Patent No.: US 8,509,996 B2
(45) Date of Patent: Aug. 13, 2013

(54) SAFETY STEERING SYSTEM FOR AUTOMOBILES

(76) Inventor: Mohammad ali Torabi Mirzaee, Yazd (IR)

( * ) Notice: Subject to any disclaimer, the term of this patent is extended or adjusted under 35 U.S.C. 154(b) by 91 days.

(21) Appl. No.: 13/179,534

(22) Filed: Jul. 10, 2011

(65) Prior Publication Data

US 2013/0013155 A1   Jan. 10, 2013

(51) Int. Cl.
   *G06F 19/00* (2011.01)
   *B62D 15/00* (2006.01)

(52) U.S. Cl.
   USPC ................................ 701/43; 701/41; 180/6.2

(58) Field of Classification Search
   USPC .......... 701/41–43; 180/6.2, 6.24; 73/117.02;
                116/28 R, 31, 34 R; 340/442
   See application file for complete search history.

(56) References Cited

U.S. PATENT DOCUMENTS

| | | | | |
|---|---|---|---|---|
| 4,913,250 A | * | 4/1990 | Emori et al. | 180/422 |
| 5,135,068 A | * | 8/1992 | Emori et al. | 180/421 |
| 5,330,024 A | * | 7/1994 | Emori et al. | 180/422 |
| 5,332,055 A | * | 7/1994 | Emori et al. | 180/422 |

* cited by examiner

*Primary Examiner* — Yonel Beaulieu
(74) *Attorney, Agent, or Firm* — Barry Choobin; Patent360 LLC

(57) ABSTRACT

The various embodiments herein provide a safety steering mechanism for an automobile. The mechanism comprises a steering wheel mechanism for changing a direction of movement of the automobile. A jack is connected to an automobile wheel for providing backward and forward movement of an axle with respect to the steering wheel movement. A hydraulic pump is providing in a hydraulic stream. A control valve regulates a direction of motion of the hydraulic stream. A plurality of directional control valves cut a hydraulic stream between the control valve and the jack. A main valve controls the backward and forward motion of the jack. At least one sensor installed on each tire of the automobile generates signals corresponding to a tire pressure. A plurality of electronic units processes signals from the plurality of the sensors and passes an output signal to an electronic control unit (ECU).

11 Claims, 5 Drawing Sheets

SAFETY STEERING SYSTEM FOR AUTOMOBILES

SPONSORSHIP STATEMENT

The present invention is sponsored by Iranian National Science foundation.

BACKGROUND

1. Technical field

The embodiments herein generally relates to a vehicle control system and particularly to a safety steering and control mechanism for an automobile. The embodiments herein more particularly relates to a safety steering mechanism for detecting a tire blowout to prevent or reduce road accident due to the tire blowout.

2. Description of the Related Art

The term "blowout" is generally used to describe a bursting tire accompanied by a rapid loss of air pressure. The general assumption is that all blowouts are caused by an increase in the internal pressure which burst a weak spot in the tire. However most blowouts are caused by a comparatively reduced air pressure allowing the tire to flex beyond its elastic limits until it overheats to a point where the rubber loses its bond to the internal fabric and steel cord reinforcement.

Tire blowouts are usually the result of an overloading of a vehicle, a damage due to an impact (either immediate or delayed depending on severity of the impact) and a massive cut that causes rapid air loss or an unnoticed small puncture which allows the leakage of air from the tire slowly lose over a period of time until it fails.

When a tire of an automobile blasts, a heavy frictional force is generated between the flat tire and the road to prevent the tire to turn under the control of the driver and hence the tire turns freely. This action causes a dynamic turning of the automobile, in other words the turning of the automobile forces the front tire to turn along with the steering wheel.

The turning happens instantly with the tire blast so that the driver cannot control the steering wheel and the steering wheel will turn freely due to the effecting forces (friction). Especially in heavy vehicles such as trucks, the steering wheel turning is so powerful that the driver will not be in a position to control the vehicle.

Several methods and systems are proposed for an air pressure warning system to constantly monitor the tire inflation pressure and notify the driver about a drop in the tire inflation pressure when the air pressure of the tire comes below a given threshold level. Once the tire bursts, even if the air pressure warning system provides a warning based on the drop in the tire inflation pressure, there is a fear that the vehicle may lose control of its movement and may crash.

In view of the foregoing discussion, there exists a need for a safety steering mechanism with an air pressure measurement system installed in the tire to monitor a variation in the tire pressure. There is also a need for a safety steering mechanism to prevent any turning forces derived from a tire blowout incident to affect the steering wheel. Further there exists a need for a safety steering mechanism to prevent an occurrence of dynamic turning and to control balance in a vehicle after a tire blow out.

The abovementioned shortcomings, disadvantages and problems are addressed herein and which will be understood by reading and studying the following specification.

Objects of the Embodiments

The primary object of the embodiments herein is to provide a safety steering mechanism to prevent any turning forces generated during a tire blow out incident from affecting a steering wheel of an automobile.

Another object of the embodiments herein is to provide a safety steering mechanism with an air pressure measurement system installed in a tire to notify a sudden variation in a tire pressure during a tire blowout incident.

Yet another object of the embodiments herein is to provide a safety steering mechanism to automatically apply brakes on the non-blasted tire of the automobile during a tire blowout.

Yet another object of the embodiments herein is to provide a safety steering mechanism to keep the steering wheel of the automobile in the straight path when the automobile is passing a highway or a straight path.

Yet another object of the embodiments herein is to provide a safety steering mechanism to prevent any dynamic turning of the steering wheel and to control balance in an automobile.

These and other objects and advantages of the embodiments herein will become readily apparent from the following detailed description taken in conjunction with the accompanying drawings.

SUMMARY

The various embodiments herein provide a safety steering system for an automobile. The system comprises a steering wheel mechanism for changing a direction of movement of the automobile, a jack connected to an automobile wheel for providing backward and forward movement of an axle with respect to the steering wheel movement, a hydraulic pump for providing a hydraulic stream, a control valve for controlling a direction of motion of the hydraulic stream, a plurality of directional control valves for interrupting/cutting the hydraulic stream between the control valve and the jack, a main valve for controlling a backward motion and a forward motion of the jack, at least one sensor installed on each tire of the automobile to generate signals corresponding to a tire pressure and a plurality of electronic units for processing the signals output from the plurality of the sensors and to issue an output signal to an electronic control unit (ECU). The detection of a decrease in a tire pressure of at least one tire causes the ECU to send an electronic command to the plurality of directional control valves to cut the hydraulic stream movement between the control valves and the jack and deviate the hydraulic stream to the main valve. The main valve locks the jack from a backward and forward movement due to an effecting forces caused by the variation in tire pressure.

According to one embodiment, the output signal indicates the tire pressure at each of the automobile tire.

According to one embodiment, the plurality of directional control valves include at least a pair of two position two port valves (2/2 valve).

According to one embodiment, the main valve is a three position two port valve.

According to one embodiment, the jack moves forward and backward when a hydraulic pressure from the hydraulic pump is applied from one side of the jack and evacuated from the other side of the jack.

According to one embodiment, the hydraulic pressure is created by the hydraulic pump by passing a pressurized hydraulic stream of a fluid.

According to one embodiment, main valve regulates the inflow of the hydraulic stream to the jack and the outflow of the hydraulic stream from the jack.

According to one embodiment, the safety steering mechanism is installed between the directional control valves and the jack.

According to one embodiment, the ECU is preloaded with a program to calculate a braking force to be applied on the tire based on a frictional force developed between the blowout tire and road.

According to one embodiment, the main valve locks the backward and forward movement of the jack caused by the frictional force between the blowout tire and the road during the tire blowout and the main valve allows the backward and forward movement of the jack only from the steering wheel.

According to one embodiment, the hydraulic pressure created by the hydraulic pump changes the main valve position and opens the main valve to allow forward and backward movement of the jack when an operator of the automobile turns the steering wheel.

According to one embodiment, the preloaded program in the ECU identifies the wheel on which the braking forces to be applied during a tire blow out.

According to one embodiment, the preloaded program in the ECU sends an electronic command to a braking system to apply brakes on at-least one of the wheel during a tire blowout.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
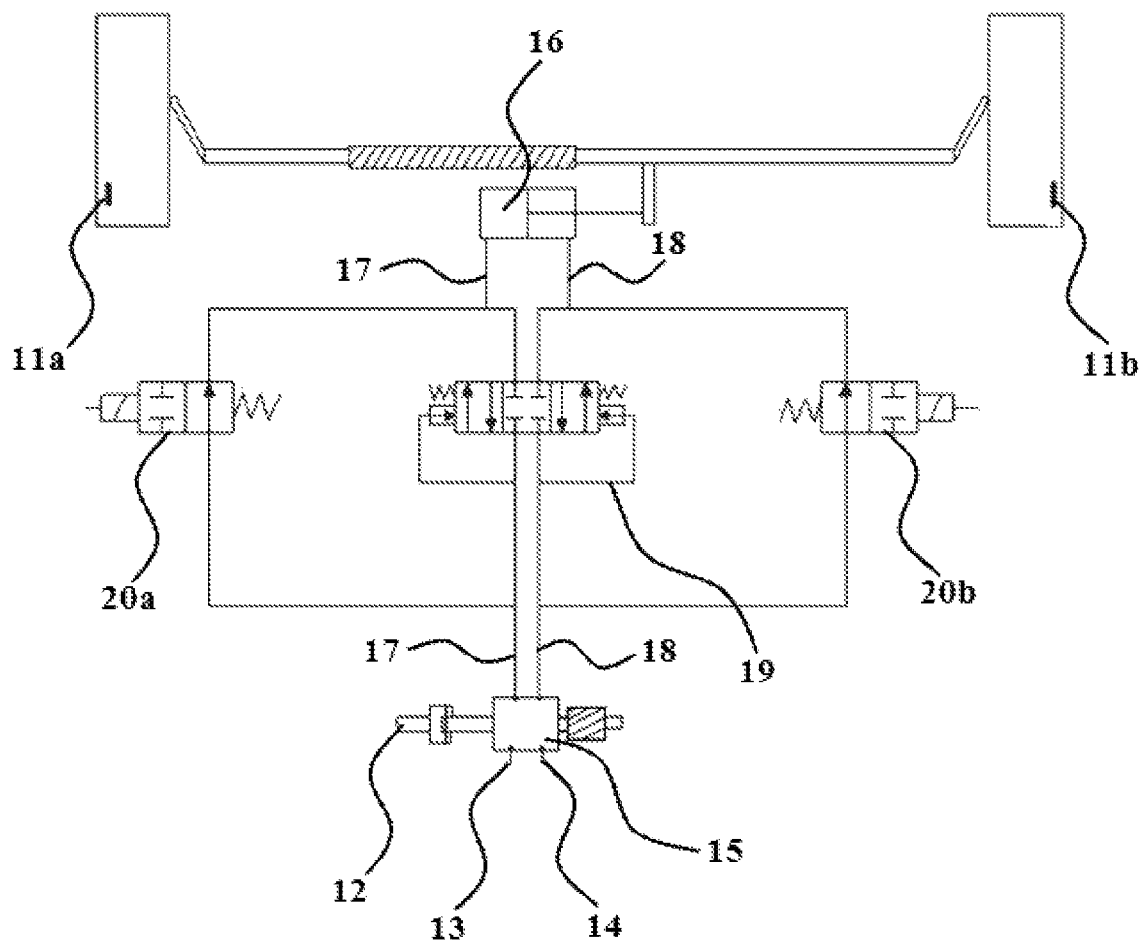
FIG. 1 illustrates a block circuit diagram of a safety steering system for automobiles, according to one embodiment herein.

Although the specific features of the embodiments herein are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a safety steering system for an automobile. The system comprises a steering wheel mechanism for changing direction of movement of the automobile, a jack connected to an automobile wheel for providing backward and forward movement of an axle with respect to the steering wheel movement, a hydraulic pump for providing a hydraulic stream, a control valve for controlling the direction of motion of the hydraulic stream, a plurality of directional control valves for cutting of the hydraulic stream between the control valve and the jack, a main valve for controlling the backward and forward motion of the jack, at least one sensor installed on each tire of the automobile to generate signals corresponding to a tire pressure and a plurality of electronic units for processing signals from the plurality of the sensors and passing an output signal to an electronic control unit (ECU). The detection of a decrease in tire pressure of at least one tire causes the ECU to send an electronic command to the plurality of directional control valves to cut the hydraulic stream movement between the control valves and the jack and deviate the hydraulic stream to the main valve and the main valve locks the jack from backward and forward movement due to an frictional forces caused by the variation in tire pressure.

The plurality of directional control valves include at least two two position two port valve (2/2 valve) and the main valve is a three position two port valve. The main valve regulates the inflow of the hydraulic stream to the jack and the outflow of the hydraulic stream from the jack.

The output signal indicates the tire pressure at each of the automobile tire.

The safety steering mechanism is installed between the directional control valves and the jack.

The jack moves forward and backward when a hydraulic pressure from the hydraulic pump is applied from one side of the jack and evacuated from the other side of the jack. The hydraulic pressure is created by the hydraulic pump by passing a pressurized hydraulic stream of a fluid. The main valve locks the backward and forward movement of the jack caused by the friction force between the blowout tire and the road during the tire blowout and the main valve allows the backward and forward movement of the jack only from the steering wheel. The hydraulic pressure created by the hydraulic pump changes the main valve position and opens the main valve to allow forward and backward movement of the jack when an operator of the automobile turns the steering wheel.

The ECU is preloaded with a program to calculate a braking force to be applied on the tire based on a friction force developed between the blowout tire and a road. The preloaded program in the ECU identifies the wheel on which the braking forces to be applied during a tire blow out and sends an electronic command to a braking system to apply brakes on at-least one of the wheel during a tire blowout.

FIG. 1 is a schematic diagram illustrating a safety steering system for an automobile, according to an embodiment herein. A safety steering mechanism comprises an air pressure measurement system comprising a first sensor 11a and a second sensor 11b installed on at least one of a left tire and a right tire of the automobile respectively. The first sensor 11a and the second sensor 11b are adapted to function in conjunction with a steering wheel 12 of the automobile. The steering wheel 12 is connected to a hydraulic pump 14 and the hydraulic pump 14 is connected to a hydraulic tank 13. The hydraulic pump 14 is further connected to a steering gear via control valve 15. The control valve 15 is connected to a jack 16 with hydraulic stream tubes (17, 18). The jack 16 is connected to a rack-and-pinion arrangement (FIG. 5) and the rack-and-pinion arrangement is connected to the tie rod of the wheel.

The hydraulic power for the steering wheel is provided by the hydraulic pump 14 driven by the automobile engine via a belt and pulley. The hydraulic pump 14 contains a set of retractable vanes that spin inside an oval chamber. The safety steering mechanism is installed between the control valve 15 and the jack 16. Now, the hydraulic stream tube 17 is connected to a main valve 19 and to a first 2/2 valve through an electronic unit 20a and then to the jack 16. Similarly, the hydraulic stream tube 18 is connected to the main valve 19 and to a second 2/2 valve through an electronic unit 20b and then to the jack 16.

The 2/2 valves on receiving a command from the electronic unit 20a cuts off the hydraulic stream, so that hydraulic stream is forced to pass through the main valve 19. When the hydraulic stream passes through the main valve 19 the safety steering mechanism is activated.

The jack 16 is a two purpose jack, which moves in a backward direction and forward direction (reciprocating motion) when a hydraulic stream (pressure) is applied from one side, and the oil is evacuated from the other side. The entry and exit points of the jack 16 are closed through the main valve 16 and the jack 16 is locked when the steering safety system is in active condition.

The sensors 11a, 11b installed in the tires of the automobile notifies the tire blowout by sending an electronic signal to the electronic unit of the 2/2 valves. The safety steering mechanism in turn forces the 2/2 valves to be closed so that the hydraulic stream passes through the main valve 19. When the hydraulic stream passes through the main valve 19, the input and output of the jack 16 is closed and jack 16 is locked and is not able to act according to the forces generated by the friction between the flat tire and the road during a tire blowout.

When a driver of the automobile turns the steering wheel 12, the pressure created by the hydraulic pump 14 changes the main valve 16 position, and opens the main valve enabling the jack 16 to move. Thus the safety steering mechanism provides the automobile to keep its balance and avoids the dynamic torque around the flat tire.

Figure 2:
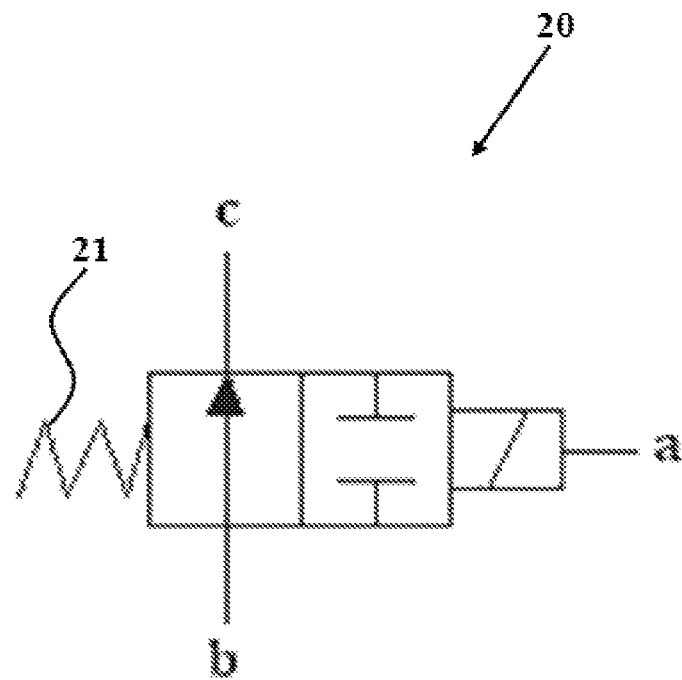
FIG. 2 illustrates a functional block diagram of a 2/2 directional control valve for cutting off the hydraulic stream in a safety steering system for automobiles, according to one embodiment herein.

FIG. 2 is a schematic diagram of a 2/2 directional control valve for cutting off the hydraulic stream, according to an embodiment herein. The 2/2 valve includes an electronic unit (a) and a spring arrangement 21. The 2/2 valves on receiving a command from the electronic unit cuts off the hydraulic stream, so that hydraulic stream is forced to pass through the main valve. When the hydraulic stream passes through the main valve the safety steering mechanism is activated.

The safety steering mechanism acts in response to the signals from the pressure measurement sensors installed in the automobile tires. These sensors notices and informs the safety steering mechanism about the tire blow out when the pressure of the air in the tire suddenly decreases indicating a tire blow out. The sensors installed in the automobile tires send an electronic signal to the electronic units associated with the 2/2 valves during a tire blow out. The electronic unit further transmits the signal to an ECU which intern sends an electronic command to the electronic unit (a) to close the valve. This obstructs the flow of hydraulic stream between (b)

and (c) as shown in FIG. 2. As the hydraulic stream route is cut off, the hydraulic stream turns back the 2/2 valve to an open position.

Figure 3:
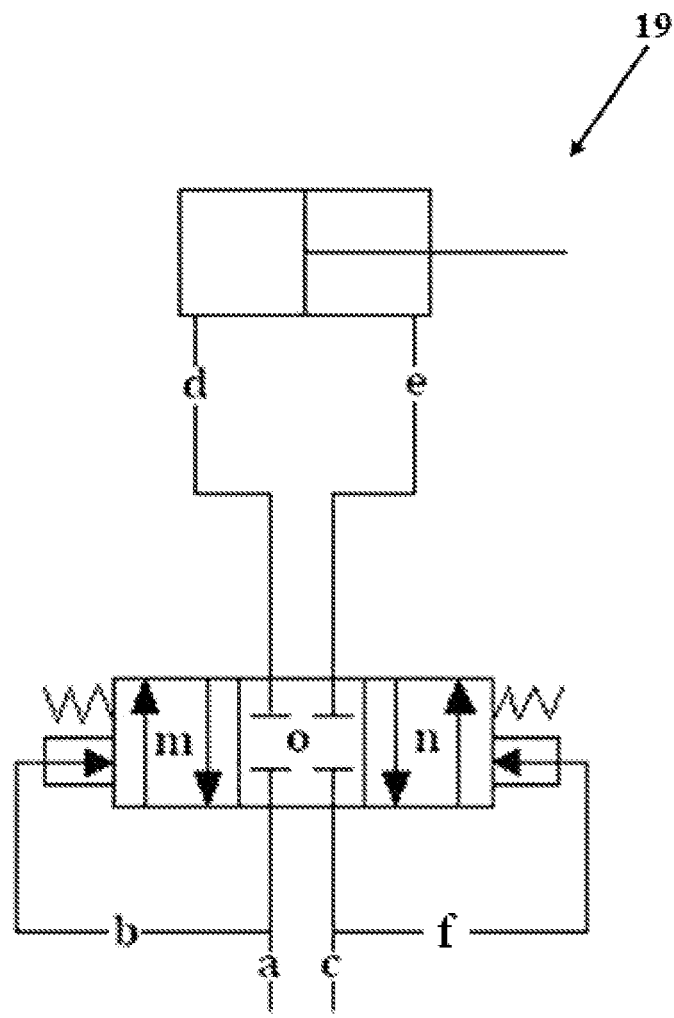
FIG. 3 illustrates a functional block circuit diagram of a hydraulic circuit with the main valve and the jack in a safety steering system for automobiles, according to an embodiment herein.

FIG. 3 illustrates a schematic diagram of the main valve and the jack, according to an embodiment herein. When the 2/2 valves closes a minor paths, the paths (e) and (d) as shown in FIG. 2 are obstructed which prevents the flow of hydraulic stream in these paths. This in turn locks the jack such that the reciprocating motion (forward and backward motion) of the jack is obstructed. When the safety steering mechanism is activated, the main valve is in (o) position and hydraulic stream routes (e) and (d) are closed. As the steering wheel rotates, the control valve conveys the hydraulic stream to the intended hydraulic stream route (a). Since the main valve is in (o) position, the hydraulic stream route (a) to hydraulic stream route (d) is obstructed. The hydraulic stream then passes through the hydraulic stream route (b) and replaces (o) position with (m) in the main valve. Then the hydraulic stream finds a way from hydraulic stream route (a) to hydraulic stream route (d). Then the jack is driven forward. Simultaneously, the hydraulic stream on the other side of the jack is evacuated. During the evacuation of the hydraulic stream back to the hydraulic tank, since the main valve is in (o) position, the hydraulic stream route (e) cannot get the hydraulic stream route (c) and replaces (o) position with (n) in the main valve. Then the hydraulic stream takes a hydraulic stream route (e) to hydraulic stream route (c) and the hydraulic stream is evacuated back to the hydraulic tank.

Similarly, when the steering wheel rotates in the opposite direction, the control valve conveys the hydraulic stream to the intended hydraulic stream route (c), and since the main valve is in (o) position, the hydraulic stream route (c) to the hydraulic stream route (e) is obstructed. Consequently the hydraulic stream passes through the hydraulic stream route (f) and replaces (o) position with (n) in the main valve. Then the hydraulic stream flows through hydraulic stream route (c) to hydraulic stream route (e). The jack is then driven backward and on the other side of the jack, the hydraulic stream is evacuated. During the evacuation of the hydraulic stream back to the hydraulic tank, since the main valve is in (o) position, the hydraulic stream route (d) cannot get the hydraulic stream route (a) and replaces (o) position with (m) in the main valve. Then the hydraulic stream takes the hydraulic stream route (d) to hydraulic stream route (a) and the hydraulic stream is evacuated back to the hydraulic tank.

Figure 4:
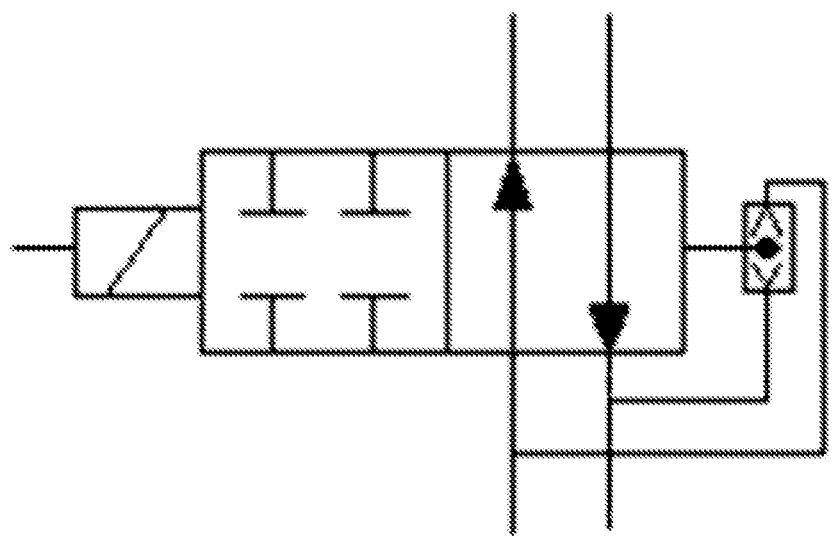
FIG. 4 illustrates a functional block diagram of the 2/2 valves accommodated in the main valve in a safety steering system for automobiles, according to one embodiment herein.

FIG. 4 illustrates a schematic diagram of the 2/2 valves accommodated in the main valve, according to an embodiment herein. According to one embodiment, in the safety steering mechanism, the 2/2 valves are accommodated in the main valve to reduce the volume and production costs. A shown in FIG. 4, the 2/2 valves are omitted and a small valve has been added to a circuit.

Figure 5:
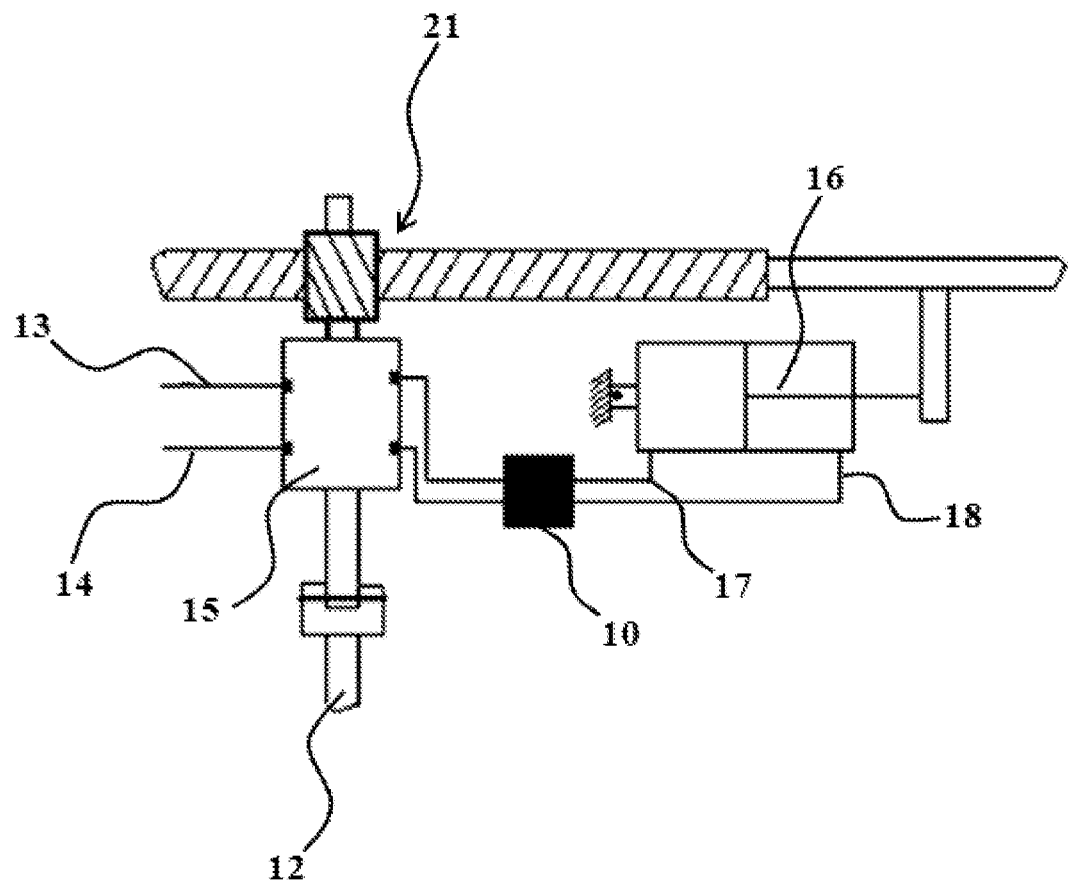
FIG. 5 illustrates a functional block diagram of a safety steering system installed between the control valve and the jack, according to an embodiment herein.

FIG. 5 illustrates a schematic diagram of the safety system mechanism installed between the control valve and the jack, according to an embodiment herein. The steering wheel 12 is connected to a hydraulic pump 14 and the hydraulic pump 14 is connected to a hydraulic tank 13. The hydraulic pump 14 is further connected to a steering gear via control valve 15. The control valve 15 is connected to a jack 16 with hydraulic stream tubes (17, 18). The safety steering mechanism 10 is installed between the control valve 15 and the jack 16. The jack 16 is connected to a rack-and-pinion arrangement 21 and the rack-and-pinion arrangement 21 is connected to the tie rod of the wheel. The hydraulic stream from the control valve 15 passes through the safety steering mechanism 10, before reaching jack 16 so that the forward and backward (reciprocating movement) movement of the jack is under the control of the safety steering mechanism and accordingly under the control of the driver of the automobile.

The process unit of the electronic unit identifies each sensor installed on the automobile tire with a particular signal, so that the electronic unit can easily find out the side from which a command is received. The electronic unit of the 2/2 valve sends the electronic command to the steering safety mechanism for activating the safety steering mechanism when a variation in the tire pressure is detected. The steering safety mechanism then sends a command to an electronic control unit (ECU) of the automobile. The ECU will be preloaded with a program and according to the defined program the ECU identifies the tire, which is blown out and finds out the tire to be braked. Then the valves and the engine of the pump are operated to control the braking pressure according to the instruction defined in the ECU. This brake force is equal to the frictional force caused between the blowout tire and a road. This keeps the automobile in balance and avoids a dynamic torque around the flat tire (blowout tire).

When the tire is blown out during a motion in the automobile, a great force is suddenly transferred to the steering wheel of the automobile. So the driver will lose control of the steering wheel.

The safety steering mechanism prevents the force generated by the tire blowout during the automobile in motion from acting on the steering wheel such that the driver does not lose the control on the automobile. The steering safety system of the embodiment is established on different kinds of cars and is considered as an option for automobiles in special situation, such as keeping the wheels in direct ways and increasing the safety index of the automobiles.

The safety steering mechanism herein is adapted to be used at a high speed in order to decrease the release of the wheels and for a better balancing of the automobile. The steering safety system of the herein increases the self confidence of the driver and decrease the stress.

The safety steering mechanism of the embodiment herein is used specially in car racing and gravel road and is adapted to be activated under the drivers command. The safety steering mechanism is activated in at least one mode as ever active, depending on the speed and automatic.

The safety steering mechanism herein is adapted to be used as a safety index of the automobile and can be used in special situation, such as keeping the wheels (or locking the wheels) in direct ways.

The safety steering mechanism of the embodiment herein increases the self confidence of the driver and decreases the stress.

The safety steering mechanism of the embodiment herein when installed doesn't change the appearance and the instructions of the automobile.

The safety steering mechanism of the embodiment herein when installed in the automobile, the hydraulic stream firstly have to pass through the safety steering mechanism to get to the jack, so the reciprocating movement of the jack is under the control of safety steering mechanism and accordingly under the control of the automobile driver.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A safety steering mechanism for an automobile, the mechanism comprising:
   a steering wheel mechanism changing a direction of a movement of an automobile;
   a jack connected to an automobile wheel providing a backward and forward movement of an axle with respect to a movement of the steering wheel;
   a hydraulic pump providing a hydraulic stream;
   a control valve controlling a direction of motion of the hydraulic stream;
   a plurality of directional control valves cutting the hydraulic stream between the control valve and the jack, and wherein the plurality of directional control valves includes a main valve and at least a pair of two position two port valve (2/2 valve), and wherein the main valve is a three position two-port valve, and wherein the main valve controls a backward and forward motion of the jack;
   a plurality of sensors measuring a tire pressure, wherein at least one sensor is installed on each tire of the automobile to generate signals corresponding to a tire pressure;
   a plurality of electronic units processing signals from the plurality of the sensors and passing an output signal to an electronic control unit (ECU) of the automobile, and wherein the plurality of the electronic units are provided in the plurality of the directional control valves;
   wherein the plurality of sensors installed in a plurality of tires are adapted to function in conjunction with a steering wheel of the automobile, and wherein the plurality of sensors installed in the tires of the automobile notify a tire blowout by sending an electronic signal to the plurality of electronic units, wherein the ECU sends an electronic command to the plurality of directional control valves to cut the hydraulic stream movement between the control valves and the jack and deviate the hydraulic stream to the main valve based on a detection of a decrease tire pressure of at least one tire and the main valve locks the jack from a backward and forward movement due to an effecting force caused by a variation in a tire pressure.

2. The mechanism according to claim 1, wherein the output signal indicates the tire pressure at each of the automobile tire.

3. The mechanism according to claim 1, wherein the jack moves forward and backward when a hydraulic pressure from the hydraulic pump is applied from one side of the jack and evacuated from another side of the jack.

4. The mechanism according to claim 1, wherein the hydraulic pressure is created by the hydraulic pump by passing a pressurized hydraulic stream of a fluid.

5. The mechanism according to claim 1, wherein main valve regulates an inflow of the hydraulic stream to the jack and an outflow of the hydraulic stream from the jack.

6. The mechanism according to claim 1, wherein the safety steering mechanism is installed between the directional control valves and the jack.

7. The mechanism according to claim 1, wherein the ECU is preloaded with a program to calculate a braking force to be applied on a tire based on a friction force developed between a blowout tire and a road.

8. The mechanism according to claim 1, wherein the main valve locks the backward and forward movement of the jack caused by the friction force between the blowout tire and the road during a tire blowout and the main valve allows the backward and forward movement of the jack only from the steering wheel.

9. The mechanism according to claim 1, wherein the hydraulic pump generates a hydraulic pressure to change a main valve position and to open the main valve to allow a forward and backward movement of the jack when an operator of the automobile turns the steering wheel.

10. The mechanism according to claim 1, wherein the preloaded program in the ECU identifies a wheel on which the braking forces is to be applied during a tire blowout.

11. The mechanism according to claim 1, wherein the preloaded program in the ECU sends an electronic command to a braking system to apply brakes on at-least one of the wheels during a tire blowout.

* * * * *